United States Patent
Fukuda et al.

(10) Patent No.: US 8,164,269 B2
(45) Date of Patent: *Apr. 24, 2012

(54) DISCHARGE LAMP LIGHTING DEVICE AND LIGHTING FIXTURE

(75) Inventors: Kenichi Fukuda, Neyagawa (JP); Nobutoshi Matsuzaki, Neyagawa (JP)

(73) Assignee: Panasonic Corporation, Osaka (JP)

( * ) Notice: Subject to any disclaimer, the term of this patent is extended or adjusted under 35 U.S.C. 154(b) by 463 days.

This patent is subject to a terminal disclaimer.

(21) Appl. No.: 12/438,582

(22) PCT Filed: Jul. 23, 2007

(86) PCT No.: PCT/JP2007/064409
§ 371 (c)(1),
(2), (4) Date: Feb. 24, 2009

(87) PCT Pub. No.: WO2008/023522
PCT Pub. Date: Feb. 28, 2008

(65) Prior Publication Data
US 2010/0244741 A1 Sep. 30, 2010

(30) Foreign Application Priority Data
Aug. 25, 2006 (JP) .................................. 2006-229271

(51) Int. Cl.
*H05B 41/16* (2006.01)
(52) U.S. Cl. ........ 315/247; 315/224; 315/307; 315/291; 315/209 R
(58) Field of Classification Search ................ 315/247, 315/224, 225, 209 R, 185 S, 291, 297, 307–311, 315/312
See application file for complete search history.

(56) References Cited

U.S. PATENT DOCUMENTS

| | | |
|---|---|---|
| 5,039,921 A | 8/1991 | Kakitani |
| 5,465,029 A | 11/1995 | Hanazaki et al. |
| 6,356,040 B1 | 3/2002 | Preis et al. |

(Continued)

FOREIGN PATENT DOCUMENTS

EP 0 413 991 2/1991
(Continued)

OTHER PUBLICATIONS

English language Abstract of JP 2003-338392, Nov. 28, 2003.
(Continued)

*Primary Examiner* — Tuyet Thi Vo
(74) *Attorney, Agent, or Firm* — Greenblum & Bernstein, P.L.C.

(57) ABSTRACT

One output power characteristic curve for supplying constant power is provided with respect to a raging voltage range of a discharge lamp, and in addition, a plurality of output power characteristic curves W1, W2 and W3 are provided with respect to a lamp voltage before the rating voltage range. There is provided minimum lamp voltage detecting means for detecting a minimum lamp voltage after a high intensity discharge lamp shifts to an arc discharge in an event where lamp power is supplied to a high intensity discharge lamp based on any initially set output power characteristic curve after the high intensity discharge lamp is started. As the minimum lamp voltage detected by the minimum lamp voltage detecting means is larger in a predetermined minimum lamp voltage range, any larger output power characteristic curve is reset from the plurality of output power characteristic curves W1, W2 and W3, and subsequent power control is performed.

6 Claims, 6 Drawing Sheets

U.S. PATENT DOCUMENTS

| | | |
|---|---|---|
| 2003/0168999 A1 | 9/2003 | Yamamoto et al. |
| 2004/0090188 A1 | 5/2004 | Ishizuka et al. |
| 2004/0251852 A1 | 12/2004 | Kambara et al. |
| 2007/0210727 A1 | 9/2007 | Sun et al. |
| 2008/0030143 A1 | 2/2008 | Goriki et al. |
| 2008/0048586 A1 | 2/2008 | Hasegawa et al. |
| 2008/0143270 A1 | 6/2008 | Sun et al. |
| 2008/0157693 A1 | 7/2008 | Yamamoto et al. |

FOREIGN PATENT DOCUMENTS

| | | |
|---|---|---|
| EP | 1 345 479 | 9/2003 |
| EP | 1345479 | 9/2003 |
| EP | 1 422 979 | 5/2004 |
| JP | 2871891 | 1/1999 |
| JP | 2001-503907 | 3/2001 |
| JP | 2003-338390 | 11/2003 |
| JP | 2003-338391 | 11/2003 |
| JP | 2003-338392 | 11/2003 |

OTHER PUBLICATIONS

English language Abstract of JP 2003-338391, Nov. 28, 2003.
English language Abstract of JP 2003-338390, Nov. 28, 2003.
English language Abstract of JP 4-342988, Nov. 30, 1992.
U.S. Appl. No. 12/438,583 to Matsuzaki et al., filed Feb. 24, 2009.
U.S. Appl. No. 12/439,083 to Onishi et al., filed Feb. 26, 2009.

DISCHARGE LAMP LIGHTING DEVICE AND LIGHTING FIXTURE

TECHNICAL FIELD

The present invention relates to a discharge lamp lighting device that lights a high brightness/high intensity discharge lamp (HID lamp) such as a high intensity mercury lamp and a metal halide lamp, and to a lighting fixture using the discharge lamp lighting device.

BACKGROUND ART

As a conventional technology, for example, it is proposed in Japanese Patent Publication No. 2871891 that a ballast stores or estimates a lamp voltage when a lamp is lighted at rating, and in response to a value of the stored or estimated lamp voltage, controls lamp power at the time when the lamp is started next time.

However, in the technology described in Japanese Patent Publication No. 2871891, a principal object thereof is to control rising of a luminous flux of the lamp against a change thereof with time and to control power for starting of the lamp in a restarting state (hot restart). Hence, the technology described in Japanese Patent Publication No. 2871891 is not to control lamp power in order to absorb variations of startability of the lamp owing to an influence of impure gas in an inside of an arc tube, which have come to be known in recent years.

In recent years, from viewpoints of energy saving and the like, an extremely high efficiency lamp in which a light emission efficiency with respect to the power supplied to the lamp is improved has been ready to be introduced into the market. However, there is also a lamp in which a composition of gas filled in the inside of the arc tube of the lamp is changed in the course of pursuing such a high efficiency, whereby an amount of mercury is consequently reduced to an extreme extent. Such a lamp in which the amount of mercury is extremely small is prone to be affected by the impure gas (for example, hydrogen) in the inside of the arc tube in comparison with the conventional lamp. Specifically, in the lamp in which the amount of mercury is extremely small, an arc discharge generated immediately after the lamp is started becomes unstable. In particular, in the lamp in which the amount of mercury is extremely small, in a state where a temperature in the arc tube immediately after the lamp is started is low and the gas filled in the inside of the arc tube is not evaporated, movement of electrons between electrodes is not active. Accordingly, such a phenomenon that the arc discharge becomes unstable occurs significantly.

Hence, in a lamp into which a large amount of the impure gas is mixed, it is apprehended that the arc discharge immediately after the lamp is started may not become stable to thereby cause a failure of lighting.

As characteristics for relatively estimating the amount of impure gas contained in the inside of the lamp, there is mentioned a minimum lamp voltage Vmin after the lamp is started and shifts to the arc discharge. When the lamp power is supplied to the lamp by a ballast provided with certain lamp voltage-lamp power characteristics after the lamp is started, the larger the amount of impure gas in the inside of the arc tube is, the higher the minimum lamp voltage Vmin becomes, and the smaller the amount of impure gas in the inside of the arc tube is, the lower the minimum lamp voltage Vmin becomes. Specifically, as the lamp has a higher minimum lamp voltage Vmin, maintenance of the arc discharge becomes more unstable, and such a lighting failure of the lamp becomes more prone to occur.

Meanwhile, in order to stably maintain the arc discharge immediately after the lamp is started, more power just needs to be supplied from the ballast to the lamp. The maximum amount of impure gas mixed in the manufacturing process of the lamp, that is, the maximum value of the minimum lamp voltage Vmin is grasped, and even in a lamp in which a value of the minimum lamp voltage Vmin is the maximum, lamp power sufficient for maintaining the arc discharge is supplied thereto from the ballast immediately after starting the lamp. In accordance with this technique, it is possible to stably shift the lamp to rating lighting without causing the lighting failure thereof immediately after the lamp is started.

However, in the case where the above-described technique is adopted, excessive lamp power will be supplied to a lamp in which the mixed amount of impure gas is small, and there is a problem that a lifetime of the lamp will be shortened by an occurrence of abrasion of the electrodes. Moreover, even in the lamp into which the large amount of impure gas is mixed immediately after production thereof, when the rating lighting is continued for a long time therein, the impure gas is adsorbed to a getter provided in an inside of an outer tube, and startability of the lamp is gradually improved. Accordingly, the power after the lamp is started will be supplied excessively thereto in a similar way to the above-described lamp in which the amount of impure gas is small.

The present invention has been made in order to solve the problems as described above. It is an object of the present invention to provide a discharge lamp lighting device that stably shifts a lamp to the rating lighting without causing the lighting failure thereof even if the lamp is a lamp in which the amount of contained impure gas is large and the discharge after being started becomes unstable, and does not supply the excessive power to the lamp in which the amount of contained impure gas is small and the lamp power immediately after being started is not required much.

DISCLOSURE OF THE INVENTION

In order to solve the above-described problems, a discharge lamp lighting device in the present invention includes: storage means which stores a data table that represents an output power characteristic curve in which one supplied power for supplying constant power is set with respect to a rating voltage range of a discharge lamp, and represents a plurality of output power characteristic curves in which a plurality of supplied powers are set with respect to a voltage in a low voltage range lower than the rating voltage range; minimum voltage detecting means for detecting a minimum voltage after the discharge lamp shifts to an arc discharge or a minimum voltage equivalent value as a voltage during a predetermined period including the minimum voltage in an event of supplying the power to the discharge lamp based on any initially set output power characteristic curve among the plurality of output power characteristic curves after the discharge lamp is started; and control means for resetting an output power characteristic curve for supplying larger supplied power to the discharge lamp among the plurality of output power characteristic curves as the minimum voltage or the minimum voltage equivalent value, which is detected by the minimum voltage detecting means, is larger in a predetermined minimum voltage range detected by the minimum voltage detecting means, and controlling the power to be supplied to the discharge lamp in accordance with the reset output power characteristic curve.

BEST MODE FOR CARRYING OUT THE INVENTION (First Embodiment)

Figure 1:
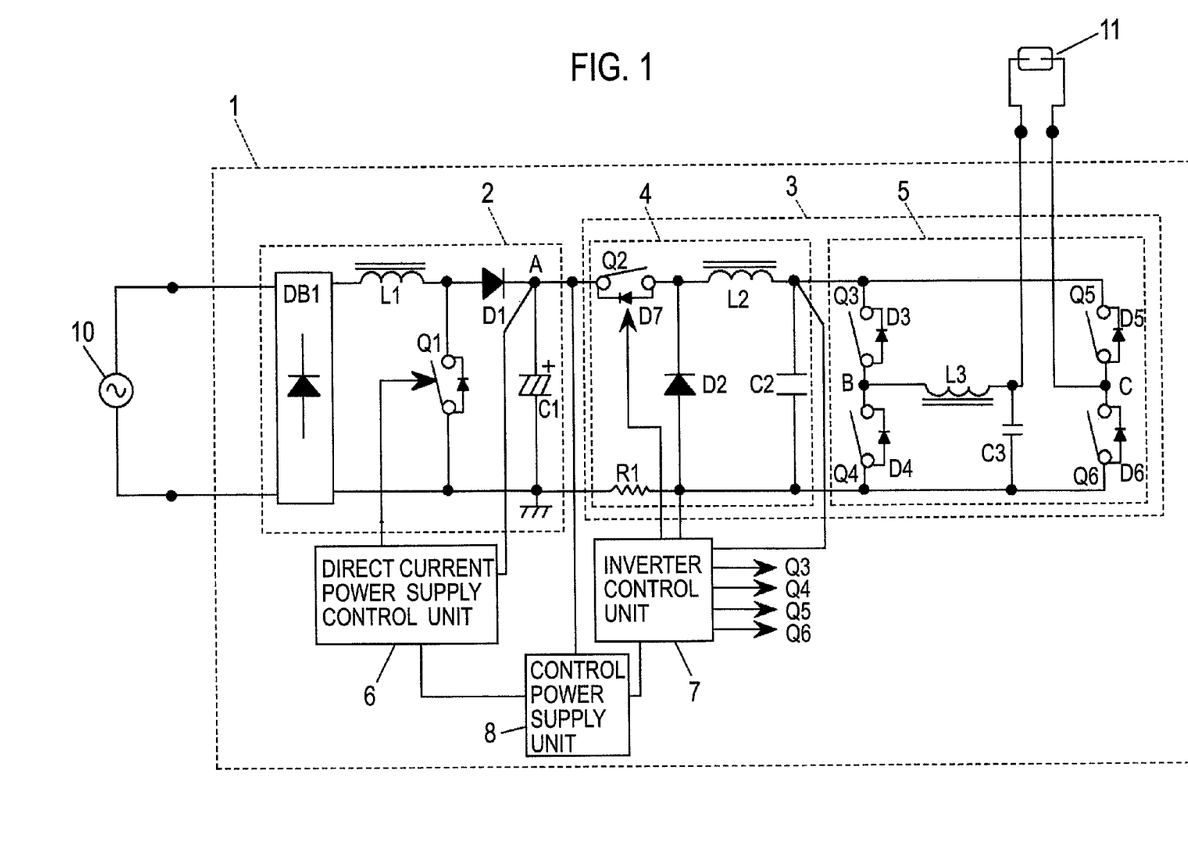
FIG. 1 is a circuit diagram of a discharge lamp lighting device to which the present invention is applied.

FIG. 1 shows a circuit diagram of a discharge lamp lighting device 1 according to a first embodiment of the present invention. This discharge lamp lighting device 1 includes a direct current power supply circuit unit 2, and an inverter circuit unit 3. The inverter circuit unit 3 is composed of a step-down chopper circuit 4, and a polarity inversion circuit 5. Moreover, the discharge lamp lighting device 1 includes a direct current power supply control unit 6 that controls operations of the direct current power supply circuit unit 2, an inverter control unit 7 that controls operations of the inverter circuit unit 3, and a control power supply unit 8 that supplies power supply voltages to the direct current power supply control unit 6 and the inverter control unit 7.

This discharge lamp lighting device 1 functions as a ballast that supplies high voltage pulse power to a discharge lamp 11 to thereby start lighting of the discharge lamp 11 concerned, and after an arc discharge is stabilized, supplies stable power to the discharge lamp 11 to thereby light the discharge lamp 11 concerned.

The direct current power supply circuit unit 2 includes a rectifier DB1 that is connected to an alternating current power supply 10 and performs full-wave rectification for an alternating current from alternating current power supply 10, and a step-up chopper circuit composed of an inductor L1, a switching element Q1, a diode D1 and a capacitor C1. The direct current power supply circuit unit 2 converts the alternating current supplied from the commercial alternating current power supply 10 into direct current power, and supplies the direct current power to the inverter circuit unit 3. The direct current power supply control unit 6 controls ON/OFF of the switching element Q1 so that a direct current voltage of the capacitor C1, which is obtained at a point A as a node between the diode D1 and the capacitor C1, can become a predetermined value. As this direct current power supply control unit 6, a commercially available integrated circuit for improving and controlling a power factor, and the like can be used.

The step-down chopper circuit 4 is composed of a switching element Q2, a diode D2, an inductor L2 and a capacitor C2. The step-down chopper circuit 4 drops a direct current input voltage supplied by the direct current power supply circuit unit 2. Here, since operations of the step-down chopper circuit 4 belong to the general technology, a description thereof will be omitted; however, is used as a stabilizing element that adjusts the power supplied to the discharge lamp (lamp) 11 by controlling ON/OFF of the switching element Q2. Note that a diode D7 is an anti-parallel diode to the switching element Q2.

In the polarity inversion circuit 5, a pair of switching elements Q3 and Q6 and a pair of switching elements Q4 and Q5 are alternately switched ON at a low frequency of several ten to several hundred Hertz by control signals from the inverter control unit 7. In such a way, the polarity inversion circuit supplies square wave alternating current power to the discharge lamp 11. However, at the starting time of starting to light the discharge lamp 11, the polarity inversion circuit 5 alternately switches ON/OFF the switching elements Q3 and Q4 at a high frequency, applies, to the discharge lamp 11, a high voltage raised by a resonance function of an inductor L3 and a capacitor C3, and causes an electrical breakdown in the discharge lamp 11. Note that diodes D3 to D6 are anti-parallel diodes to the respective switching elements Q3 to Q6.

The inverter control unit 7 detects a voltage stored in the capacitor C2, and thereby detects a lamp voltage V1a applied to the discharge lamp 11, and moreover, detects a chopper current by means of a resistor R1, and thereby detects a current supplied to the discharge lamp. In a memory (storage means, not shown), the inverter control unit 7 stores a data table that represents, as shown in FIG. 2 to be described later, an output power characteristic curve showing a relationship between a present applied voltage and the power to be supplied to the discharge lamp 11 (hereinafter, referred to as supplied power).

In accordance with the output power characteristic curve, the inverter control unit 7 controls opening/closing of the switching element Q2 of the step-down chopper circuit 4 so as to obtain supplied power W1a corresponding to the detected applied voltage V1a. Moreover, the inverter control unit 7 supplies control signals to the switching elements Q3 to Q6 of the polarity inversion circuit 5, and controls polarity inversion operations.

After the discharge lamp 11 is started, an output terminal voltage of the step-down chopper circuit 4 becomes substantially equal to the applied voltage V1a of the discharge lamp 11. A value of a divided voltage of the output terminal voltage is read in as an equivalent value to the applied voltage V1a by the inverter control unit 7. In response to the value read in as the equivalent value to the applied voltage V1a, the inverter control unit 7 decides the supplied power W1a to be supplied to the discharge lamp 11, then controls the switching element Q2 to be switched ON/OFF, and thereby generates the desired supplied power W1a. The supplied power W1a is calculated based on the output power characteristic curve stored in the memory (storage means) of the inverter control unit 7. In the memory of the inverter control unit 7, the output power characteristic curve is stored as the data table of the supplied power W1a to be supplied to the discharge lamp 11 in response to the applied voltage V1a thus read in.

Figure 2:
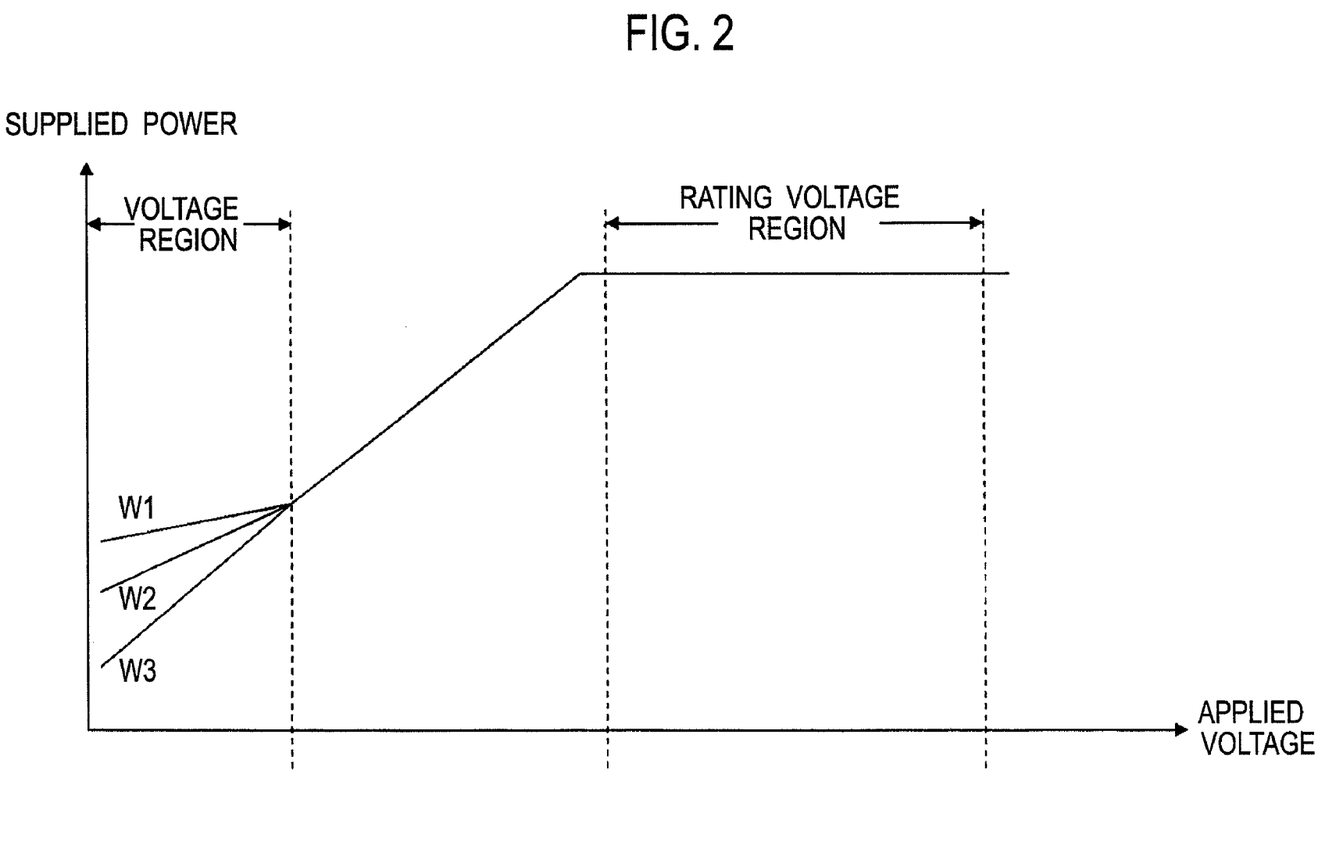
FIG. 2 is a characteristic chart showing an output power characteristic curve for use in a discharge lamp lighting device according to a first embodiment of the present invention.
Figure 3:
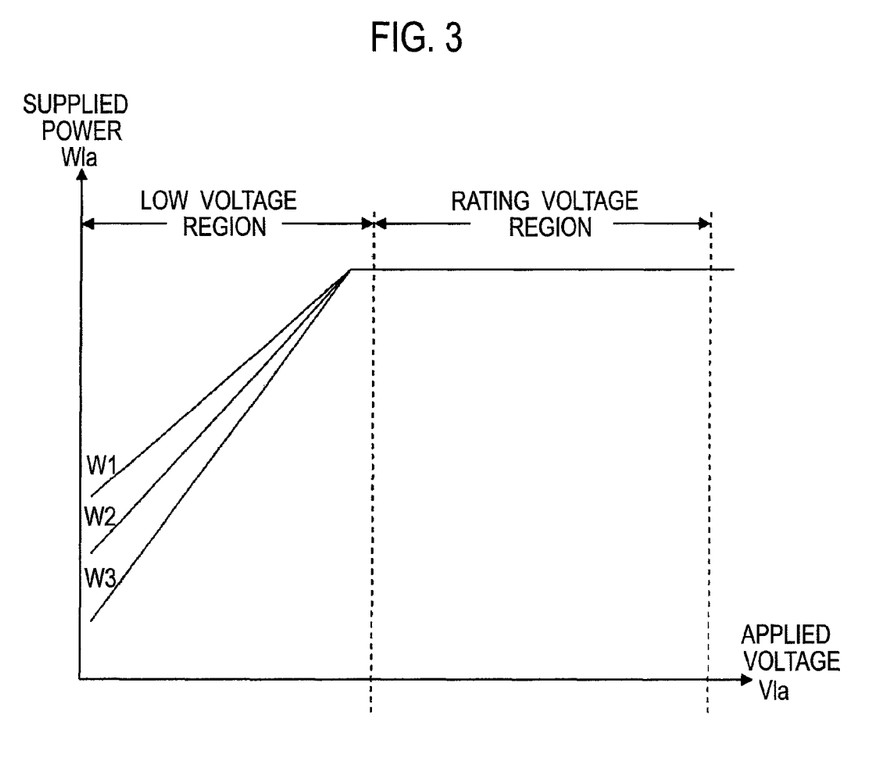
FIG. 3 is a characteristic chart showing an output power characteristic curve in a second embodiment of the present invention.

FIG. 2 shows the output power characteristic curve as output characteristics representing the relationship between the voltage applied to the discharge lamp 11 of the discharge lamp lighting device 1 according to the first embodiment of the present invention and the power to be supplied to the discharge lamp 11. A feature of this output power characteristic curve is that a plurality of the supplied powers are set with respect to the applied voltage in a low voltage region where the voltage applied to the discharge lamp 11 is low. Note that this output power characteristic curve may be one as shown in FIG. 3 as will be described later.

A power curve W1 in such a low lamp voltage region is output characteristics capable of stably lighting, from an arc discharge immediately after such lamp starting, a discharge lamp 11 in which the maximum amount of impure gas is contained in a production process of the discharge lamp 11, that is, a discharge lamp 11 in which the minimum lamp voltage Vmin is the highest. A power curve W2 is output characteristics capable of stably lighting a discharge lamp 11 in which the value of the minimum lamp voltage Vmin is intermediate from the arc discharge immediately after the lamp starting. A power curve W3 is output characteristics capable of stably lighting a discharge lamp 11 in which the minimum lamp voltage Vmin is low from the arc discharge immediately after the lamp starting.

Moreover, the above-described discharge lamp lighting device 1 is provided with a function to detect the minimum applied voltage Vmin after the discharge lamp 11 is started and shifts to the arc discharge or an applied voltage (minimum applied voltage equivalent value Vmin') during a predetermined period, which includes a minimum applied voltage as a value equivalent thereto. The discharge lamp lighting device 1 is capable of switching the above-described output power characteristic curves in the low voltage region in response to a value of the detected voltage.

Specifically, in the case where the supplied power immediately after starting the discharge lamp 11 is supplied in accordance with any initial output power characteristic curve of the output power characteristic curves W1 to W3, the discharge lamp lighting device 1 detects that a difference is made in the value of the minimum applied voltage Vmin depending on the amount of impure gas by a minimum applied voltage detecting function of the inverter control unit 7, which will be described later. In the case where the detected minimum applied voltage Vmin is large, the discharge lamp lighting device 1 switches subsequent output characteristics to the output power characteristic curve W1, in the case where the detected minimum applied voltage Vmin is intermediate, the discharge lamp lighting device 1 switches the subsequent output characteristics to the output power characteristic curve W2, and in the case where the detected minimum applied voltage Vmin is small, the discharge lamp lighting device 1 switches the subsequent output characteristics to the output power characteristic curve W3. In such a way, the discharge lamp lighting device 1 supplies the supplied power suitable for the discharge lamp 11 while stably maintaining the arc discharge immediately after starting the discharge lamp 11, thereby eliminates excessive supply of the supplied voltage, and thus can prevent abrasion of electrodes of the discharge lamp 11.

With regard to the output power characteristic curve set initially in the discharge lamp lighting device 1, which are as described above, in the case where the discharge lamp 11 in which the large amount of impure gas is contained in the production process is defined as a an adaptable lamp, it is desirable to select output characteristics similar to the output power characteristic curve W1, and in the case where the discharge lamp 11 in which the amount of impure gas thus contained is relatively small is defined as the adaptable lamp, it is desirable to select the output power characteristic curve W2 or W3.

If the discharge lamp 11 in which the amount of impure gas is large is lighted by the discharge lamp lighting device 1 that has selected the output power characteristic curves W2 and W3, then it is considered that a lighting failure that the discharge lamp 11 is extinguished immediately after the discharge lamp 11 is started occurs. However, in the case where the lighting failure immediately after the discharge lamp 11 is started occurs, then, at the time of starting the discharge lamp 11 next time, the output power characteristic curve W1 is selected as the output power characteristic curve for the time of the initially setting. In such a way, in the case of thereafter lighting the discharge lamp 11 in which the amount of impure gas is large, repetition of the lighting failure that the discharge lamp 11 is extinguished immediately after starting the discharge lamp 11 is avoided.

Figure 4:
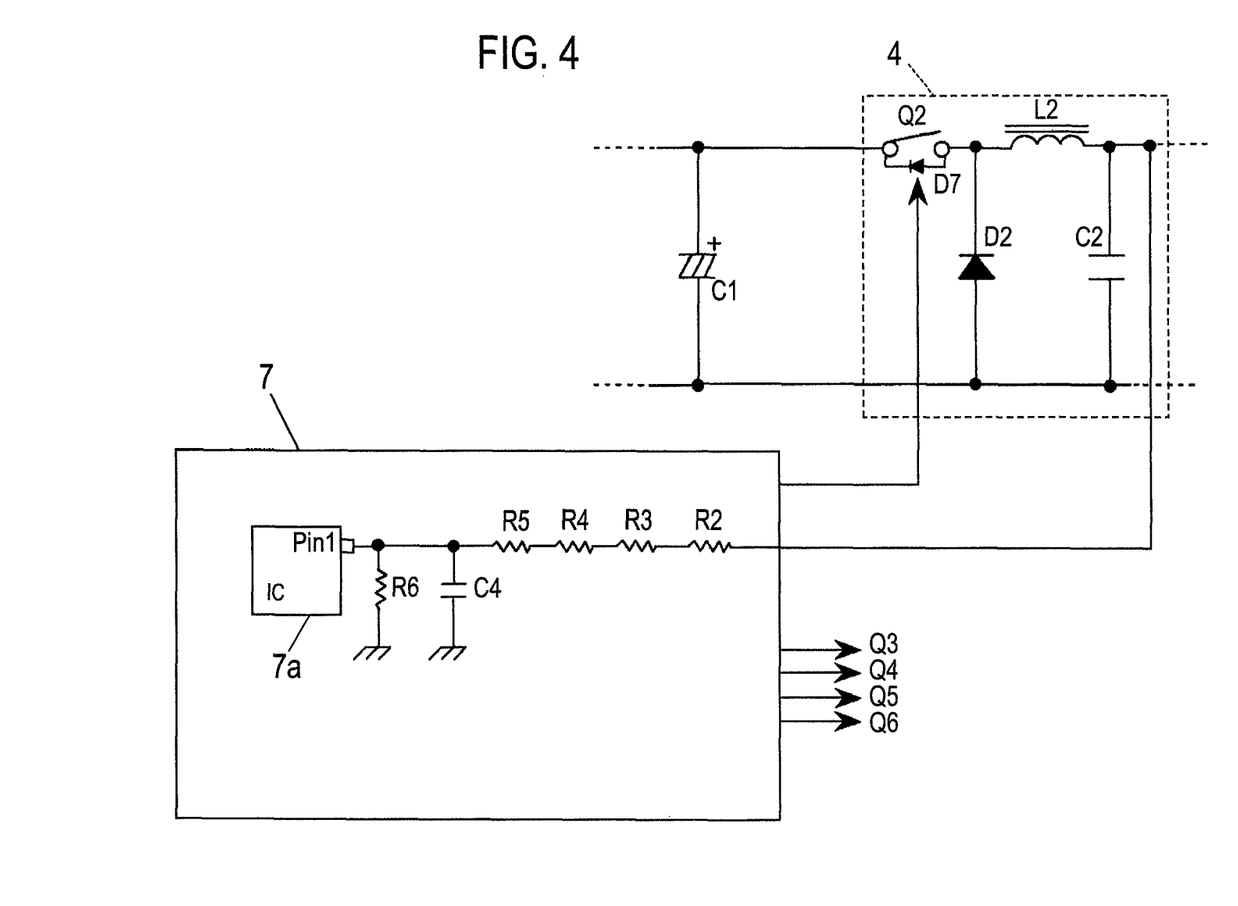
FIG. 4 is a circuit diagram showing a configuration of a minimum lamp voltage detection circuit of the discharge lamp lighting device to which the present invention is applied.

Specifically, the inverter control unit 7 detects the minimum applied voltage equivalent value Vmin' after the discharge lamp 11 is started and shifts to the arc discharge. FIG. 4 shows an example of a minimum lamp voltage detection circuit of the inverter control unit 7. As shown in FIG. 4, the inverter control unit 7 divides and smoothes the output voltage of the step-down chopper circuit 4 after the discharge lamp 11 is started by resistors R2 to R6 and a capacitor C4, and reads in the divided/smoothed output voltage by a minimum applied voltage detector IC 7a.

Figure 5:
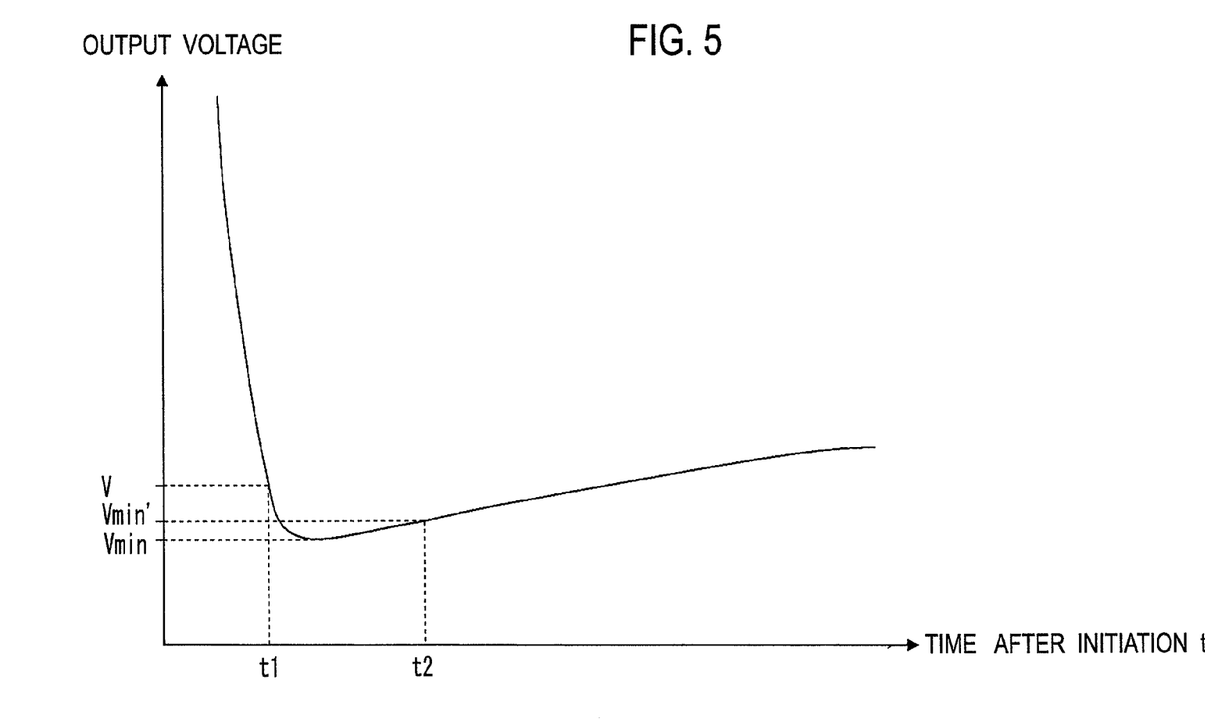
FIG. 5 is an explanatory chart showing a transition of an output voltage of a step-down chopper circuit after the discharge lamp lighting device of the present invention shifts to an arc discharge.

The output voltage of the step-down chopper circuit 4 after the discharge lamp 11 is started shows a transition as shown in FIG. 5. FIG. 5 shows the output voltage of the step-down chopper circuit 4 on an axis of ordinates, and shows an elapsed time after the discharge lamp 11 is started on an axis of abscissas. The minimum applied voltage detector IC 7a reads in the transition of the output voltage of the step-down chopper circuit 4 after the discharge lamp 11 is started. The minimum applied voltage detector IC 7a reads in an output voltage of the step-down chopper circuit 4 at arbitrary timing during a predetermined period from a time t1 to a time t2 after elapse of a predetermined time after the discharge lamp 11 is started. This applied voltage during the predetermined period from the time t1 to the time t2 includes the minimum applied voltage Vmin of the discharge lamp 11. This arbitrary timing during the predetermined period from the time t1 to the time t2 is set in advance in the minimum applied voltage detector IC 7a. The minimum applied voltage detector IC 7a detects a voltage value within a range of the read output voltages V to Vmin of the step-down chopper circuit 4, as the minimum applied voltage equivalent value Vmin'.

In response to a value of the read minimum applied voltage equivalent value Vmin', the inverter control unit 7 resets one from among the above-described plurality of output power characteristic curves in the low voltage region, and thereafter, performs control for the power in order to shift the discharge lamp 11 to a stable lighting state in accordance with the reset output power characteristic curve.

Next, a description will be made of operations of the discharge lamp lighting device 1 from immediately after starting the discharge lamp 11 to a time when the discharge lamp 11 reaches the stable lighting state.

Immediately after starting the discharge lamp 11, the discharge lamp lighting device 1 supplies a lamp current I1a corresponding to the applied voltage V1a along the initially set output power characteristic curve W1. Here, the discharge lamp lighting device 1 reads in the minimum applied voltage equivalent value Vmin' after starting the discharge lamp 11. The value of this minimum applied voltage equivalent value Vmin' becomes larger as a larger amount of the impure gas is contained in the inside of the discharge lamp 11.

The inverter control unit 7 compares the value of the read minimum applied voltage equivalent value Vmin' with a threshold value Vref1 and a threshold value Vref2

(Vref1>Vref2), which are stored in the internal memory of the inverter control unit 7. As a result, in the case where the minimum applied voltage equivalent value Vmin' is equal to or larger than Vref1 (Vmin'≧Vref1), the inverter control unit 7 resets the output power characteristic curve W1 as subsequent output characteristics. In the case where the minimum applied voltage equivalent value Vmin' is equal to or larger than Vref2 and smaller than Vref1 (Vref2≦Vmin'<Vref1), the inverter control unit 7 resets the output power characteristic curve W2 as the subsequent output characteristics. In the case where the minimum applied voltage equivalent value Vmin' is smaller than Vref2 (Vmin'<Vref2), the inverter control unit 7 resets the output power characteristic curve W3 as the subsequent output characteristics.

As described above, by resetting the output power characteristic curve for controlling the power to be supplied to the discharge lamp 11, the discharge lamp lighting device 1 can supply much power to the discharge lamp 11 in which the large amount of impure gas is contained until the applied voltage reaches a rating applied voltage. As a result, the discharge lamp lighting device 1 can stably maintain the arc discharge of the discharge lamp 11 in which the large amount of impure gas is contained. Meanwhile, by resetting the output power characteristic curve for controlling the power to be supplied to the discharge lamp 11, the discharge lamp lighting device 1 can suppress the supply of the power to the discharge lamp 11 in which the amount of contained impure gas is small. As a result, it becomes possible for the discharge lamp lighting device 1 to avoid continuous application of an excessive stress to the electrodes of the discharge lamp 11 in which the amount of impure gas is small.

(Second Embodiment)

Next, a description will be made of a second embodiment of the present invention.

FIG. 3 shows an output power characteristic curve stored in an inverter control unit 7 of a discharge lamp lighting device 1 according to a second embodiment of the present invention. Here, a feature of the present invention is in that data tables of a plurality of output power characteristic curves in a low voltage region are stored in advance in a memory of the inverter control unit 7. Moreover, as an initial value of the output power characteristic curve in the low voltage region after the discharge lamp 11 is started, an output power characteristic curve W1 in which an output becomes the largest is selected in advance, and the inverter control unit 7 performs the power control immediately after the discharge lamp 11 is started in accordance with the output power characteristic curve W1.

In place of the output power characteristic curve shown in FIG. 2, the output power characteristic curve of the discharge lamp lighting device 1, which is shown in FIG. 3, is stored in the memory of the inverter control unit 7. Also in the case of controlling the power to be supplied to the discharge lamp 11 by the inverter control unit 7 with reference to the output characteristic curve as described above, similar effects to the above-mentioned effects can be obtained.

(Embodiment 3)

Next, a description will be made of a discharge lamp lighting device 1 according to a third embodiment of the present invention. A basic circuit configuration of this discharge lamp lighting device 1 according to the third embodiment is the same as those of the above-mentioned embodiments, and accordingly, the same reference numerals are assigned to the same portions, whereby a detailed description thereof will be omitted.

In this discharge lamp lighting device 1 according to the third embodiment, the output power characteristic curve W3 in which the output becomes the smallest in FIG. 2 or FIG. 3 is selected as an initial setting of an output power characteristic curve in a low voltage region after the discharge lamp 11 is started. An inverter control unit 7 compares a value of a read minimum applied voltage equivalent value Vmin' with a threshold value Vref3 and a threshold value Vref4 (Vref3>Vref4), which are stored in an internal memory thereof. As a result, in the case where the minimum applied voltage equivalent value Vmin' is equal to or larger than Vref3 (Vmin'≧Vref3), the inverter control unit 7 resets the output power characteristic curve W1 as subsequent output characteristics. In the case where the minimum applied voltage equivalent value Vmin' is equal to or larger than Vref4 and smaller than Vref3 (Vref4≦Vmin'<Vref3), the inverter control unit 7 resets the output power characteristic curve W2 as the subsequent output characteristics. In the case where the minimum applied voltage equivalent value Vmin' is smaller than Vref4 (Vmin'<Vref4), the inverter control unit 7 resets the output power characteristic curve W3 as the subsequent output characteristics.

In the first embodiment or the second embodiment, the output power characteristic curve W1 in which the output is the largest is selected as the initial value of the output power characteristic curve. Therefore, during the period from when the minimum applied voltage equivalent value Vmin' is read in until the output power characteristic curve is reset, the large power is supplied to the discharge lamp 11. For example, in the case where it is less probable that the discharge lamp 11 in which the large amount of impure gas is contained may be provided to the market, the excessive power is supplied to the discharge lamp 11 in which the amount of impure gas is small every time when the discharge lamp 11 is started.

In this connection, the discharge lamp lighting device 1 according to the third embodiment uses the output power characteristic curve W3 in which the power output is the smallest, as the initially set output power characteristic curve read in by the inverter control unit 7 at the time of starting the discharge lamp 11. In such a way, it can be avoided applying the excessive power to a majority of the discharge lamps 11 introduced into the market, in which the amount of impure gas is small.

As described above, in the case where the output power characteristic curve W3 for supplying the lowest power to the discharge lamp 11 and lighting the discharge lamp 11 is selected, it is possible, though less probable, that the discharge lamp 11 in which the large amount of impure gas is contained may be lighted in the market. In this case, the supplied power to the discharge lamp 11 immediately after the discharge lamp 11 is started is small. Accordingly, it is possible that the discharge lamp 11 may become incapable of maintaining the arc discharge to thereby cause the lighting failure before the inverter control unit 7 reads in the minimum applied voltage equivalent value Vmin' and resets the output power characteristic curve. In the case where the discharge lamp 11 is extinguished immediately after the discharge lamp 11 is started, the inverter control unit 7 detects the lighting failure, and resets the initial setting of the output power characteristic curve to the output power characteristic curve W1 in which the power output is the largest. Thereafter, in the case where the discharge lamp 11 is started one more time, the lighting failure immediately after the discharge lamp 11 is started can be avoided continuing.

(Embodiment 4)

Figure 6:
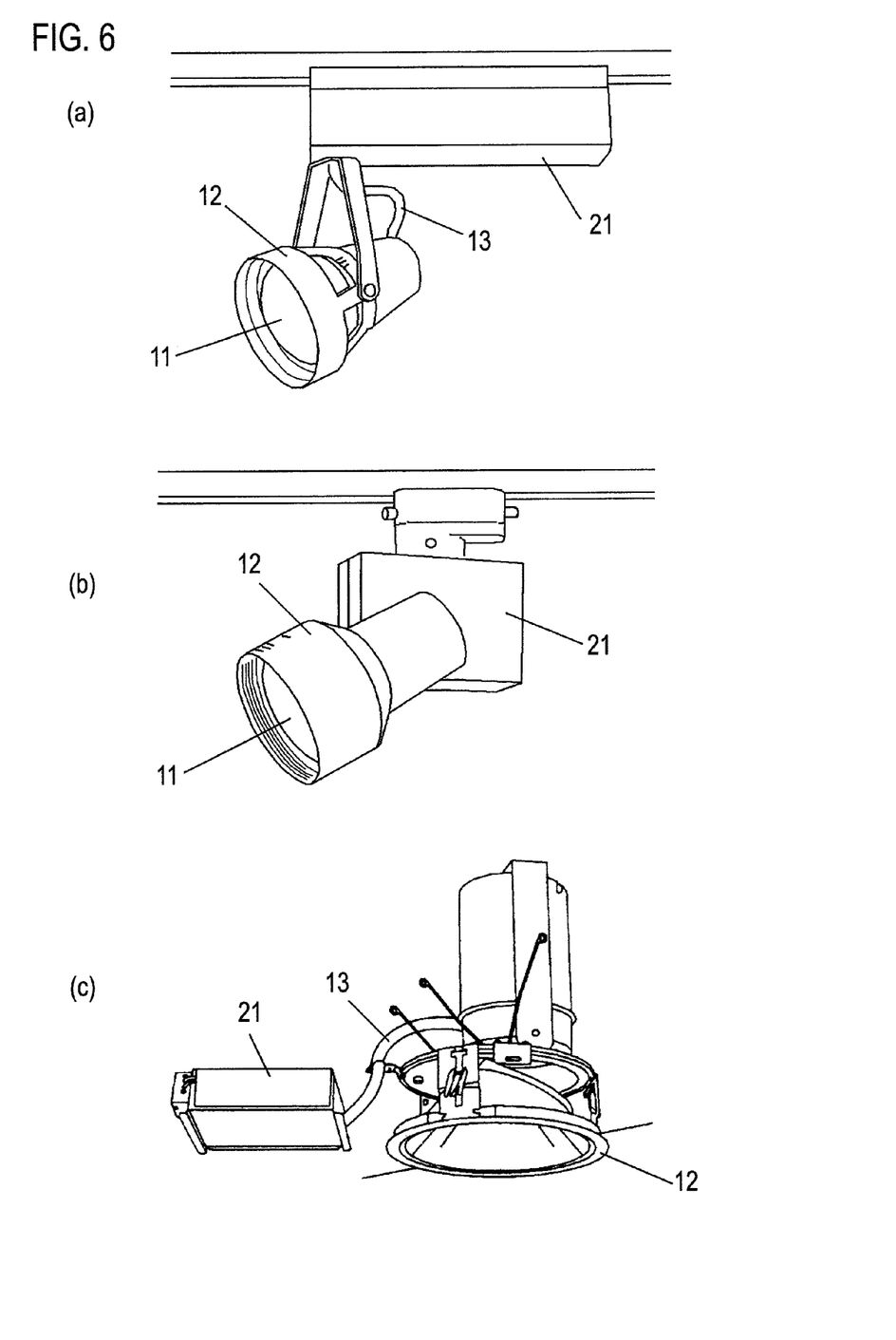
FIG. 6 is perspective views showing exterior appearances of lighting fixtures of a fourth embodiment of the present invention.

As shown in FIGS. 6A to 6C, a fourth embodiment of the present invention is a lighting fixture using the above-mentioned discharge lamp lighting device 1 of the present invention.

FIGS. 6A and 6B are configuration examples of individually using, for a spotlight, an HID lamp (high intensity discharge lamp) corresponding to the above-mentioned discharge lamp 11, and FIG. 6C is a configuration example of using, for a downlight, the HID lamp (high intensity discharge lamp) corresponding to the above-mentioned discharge lamp 11. In each of FIGS. 6A to 6C, reference numeral 21 denotes a ballast that houses the circuit of the discharge lamp lighting device, reference numeral 11 denotes the discharge lamp, reference numeral 12 denotes a lamp body that attaches the discharge lamp thereinto, and reference numeral 13 denotes a wire. A plurality of these lighting fixtures may be combined to thereby construct an illumination system.

Any of the discharge lamp lighting devices 1 of the above-mentioned embodiments is used as the lighting device for each of these lighting fixtures. In such a way, even if the discharge lamp is the discharge lamp 11 in which the amount of contained impure gas is large and the maintenance of the arc discharge after the discharge lamp 11 concerned is started is unstable, the discharge lamp 11 can be shifted to the stable lighting state without causing the lighting failure. Moreover, even in the discharge lamp 11 in which the amount of contained impure gas is small and the supplied power immediately after the discharge lamp 11 concerned is started is not required much, there is an advantage that the excessive power is not supplied thereto.

Industrial Applicability

In accordance with the present invention, even if the discharge lamp is such a discharge lamp in which the amount of contained impure gas is large and the maintenance of the arc discharge immediately after the discharge lamp concerned is started is unstable, the discharge lamp concerned can be shifted to the stable lighting state without causing the lighting failure. Moreover, even in the discharge lamp in which the amount of impure gas is small and the lamp power is not required much immediately after the discharge lamp concerned is started, there is an advantage that the excessive power is not supplied thereto.

The invention claimed is:

1. A discharge lamp lighting device, comprising:
    storage means which stores a data table that represents an output power characteristic curve in which one supplied power for supplying constant power is set with respect to a rating voltage range of a discharge lamp, and represents a plurality of output power characteristic curves in which a plurality of supplied powers are set with respect to a voltage in a low voltage range lower than the rating voltage range;
    minimum voltage detecting means for detecting a minimum voltage after the discharge lamp shifts to an arc discharge or a minimum voltage equivalent value as a voltage during a predetermined period including the minimum voltage in an event of supplying the power to the discharge lamp based on any initially set output power characteristic curve among the plurality of output power characteristic curves after the discharge lamp is started; and
    control means for resetting an output power characteristic curve for supplying larger supplied power to the discharge lamp among the plurality of output power characteristic curves as the minimum voltage or the minimum voltage equivalent value, which is detected by the minimum voltage detecting means, is larger in a predetermined minimum voltage range detected by the minimum voltage detecting means, and controlling the power to be supplied to the discharge lamp in accordance with the reset output power characteristic curve.

2. A lighting fixture, comprising: the discharge lamp lighting device according to claim 1.

3. The discharge lamp lighting device according to claim 1, wherein the initially set output power characteristic curve is an output power characteristic curve in which highest supplied power is set among the plurality of output power characteristic curves, the output power characteristic curve having the highest supplied power set therein being to be reset in an event where the minimum voltage or the minimum voltage equivalent value is a maximum value in the predetermined minimum voltage range.

4. A lighting fixture, comprising: the discharge lamp lighting device according to claim 3.

5. The discharge lamp lighting device according to claim 1, wherein
    the initially set output power characteristic curve is an output power characteristic curve other than an output power characteristic curve in which highest supplied power is set among a plurality of output power characteristic curves before the rating voltage range, the output power characteristic curve having the highest supplied power set therein being to be reset in an event where the minimum voltage or the minimum voltage equivalent value is a maximum value in the predetermined minimum voltage range, and
    in an event where the discharge lamp is extinguished after lighting of the discharge lamp is started, the control means resets the initially set output power characteristic curve to the output power characteristic curve in which the highest supplied power is set among the plurality of output power characteristic curves, the output power characteristic curve having the highest supplied power set therein being to be reset in the event where the minimum voltage or the minimum voltage equivalent value is the maximum value in the predetermined minimum voltage range, and thereafter, the control means lights the discharge lamp one more time.

6. A lighting fixture, comprising: the discharge lamp lighting device according to claim 5.

* * * * *